INVENTOR.
MARVIN H. GROVE
ATTORNEYS

Nov. 21, 1967 — M. H. GROVE — 3,353,784
VALVE CONSTRUCTION
Filed Dec. 1, 1964 — 4 Sheets-Sheet 4

INVENTOR.
MARVIN H. GROVE
BY
ATTORNEYS ns Patent Office 3,353,784
Patented Nov. 21, 1967

3,353,784
VALVE CONSTRUCTION
Marvin H. Grove, Piedmont, Calif., assignor to M. & J. Valve Company, Houston, Tex., a corporation of Delaware
Filed Dec. 1, 1964, Ser. No. 415,075
1 Claim. (Cl. 251—174)

ABSTRACT OF THE DISCLOSURE

A valve having a sealing assembly including a sleeve-like ring of resilient material bonded to a rigid metal ring. The resilient ring has a cylindrical surface which slidably interfits with the valve body and engages a resilient O-ring carried by the body. The sleeve is relatively small in radial dimensioning and its narrow end face is pressed in sealing contact with the valve member.

---

This invention relates generally to valves such as are employed for controlling fluid flow, and sealing means for use in such valves.

In the construction of the more common types of flow control valves, such as valves of the gate and ball types, various sealing arrangements have been used for forming fluid-tight seals between the movable valve part and the associated parts of the body. Generally it is desirable to employ a sealing arrangement which will afford a substantial amount of accommodation. This facilitates the manufacture of valves in the larger sizes and it simplifies alignment and machining requirements. In my Patent 3,121,553, granted Feb. 18, 1964, I have disclosed a valve having sealing means which affords a substantial degree of accommodation. The sealing means consists of a sleeve-like seal ring made of relatively hard resilient material like nylon, together with a relatively rigid carrier ring. This assembly is movably fitted within a recess formed in one of the valve parts, whereby one end face of the nylon seal ring is adapted to form sealing contact with the valve working surface formed upon the other valve part. The seal ring is sealed with respect to the one body part and it is yieldably urged by spring means against the valve working surface on the other part.

In my copending application Ser. No. 190,174, filed Apr. 25, 1962, now Patent No. 3,166,291, I have shown such a sealing assembly provided with what may be termed a snap-in feature. This snap-in feature facilitates installation of the seal ring in that it permits the seal ring to be forced into its operating position, and thereafter retains the seal ring but permits accommodating movements of the same. In my copending application Ser. No. 253,416, filed Jan. 23, 1963, now abandoned, I have shown a sealing assembly of this general type in which the seal ring is again made of relatively hard resilient material like nylon, and its one end is provided with a relatively resilient insert for establishing sealing contact with the adjacent valve working surface of the valve part.

It is an object of the present invention to provide a relatively simplified sealing assembly of the type disclosed and claimed in my Patent 3,121,553.

Another object of the invention is to provide an improved valve and sealing means therefor which will facilitate the use of a wide variety of resilient materials.

Additional objects and features of the invention will appear from the following description in which the preferred embodiments have been set forth in detail in conjunction with the accompanying drawing.

Referring to the drawing.

Figure 1:
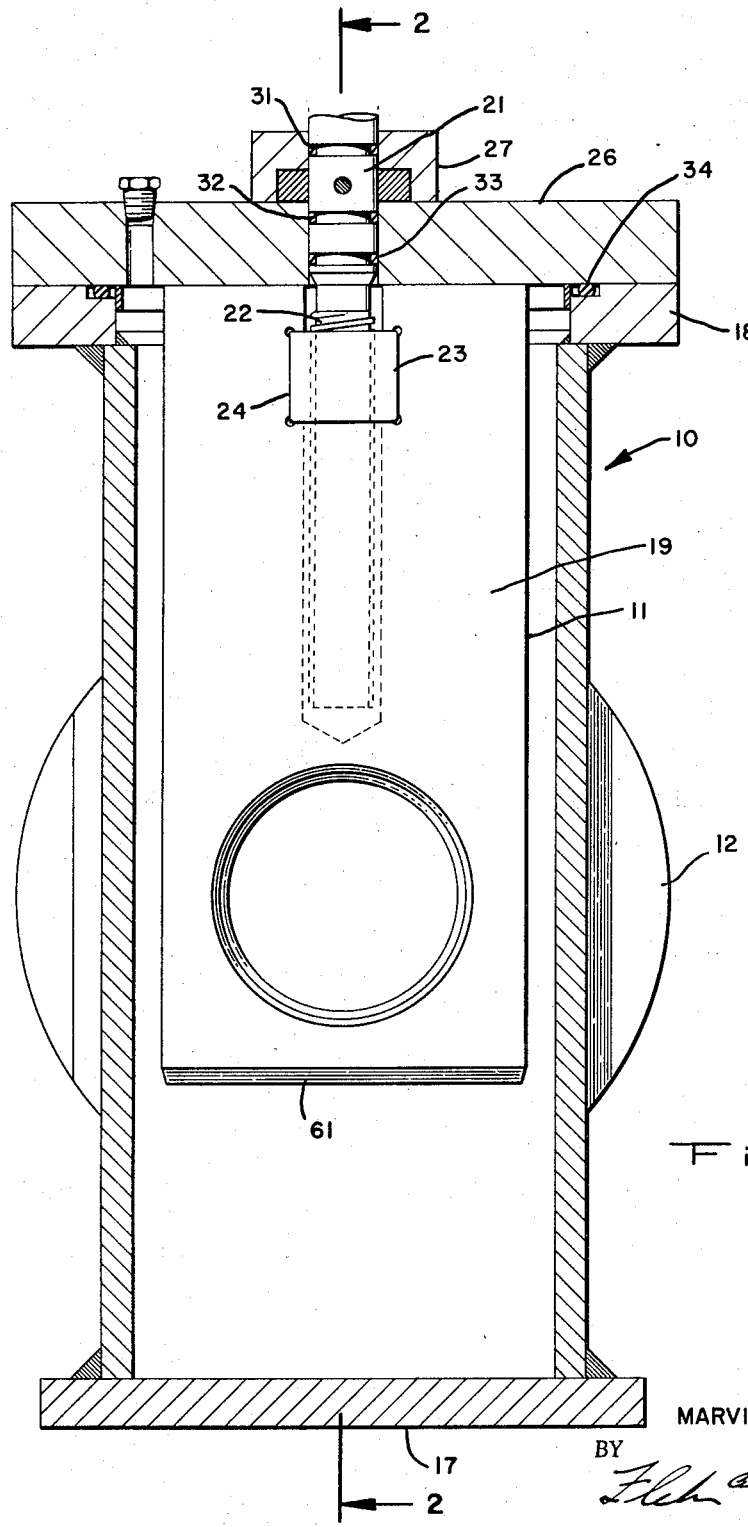
FIGURE 1 is an elevational view in section illustrating a valve of the gate type utilizing the present invention.
Figure 2:
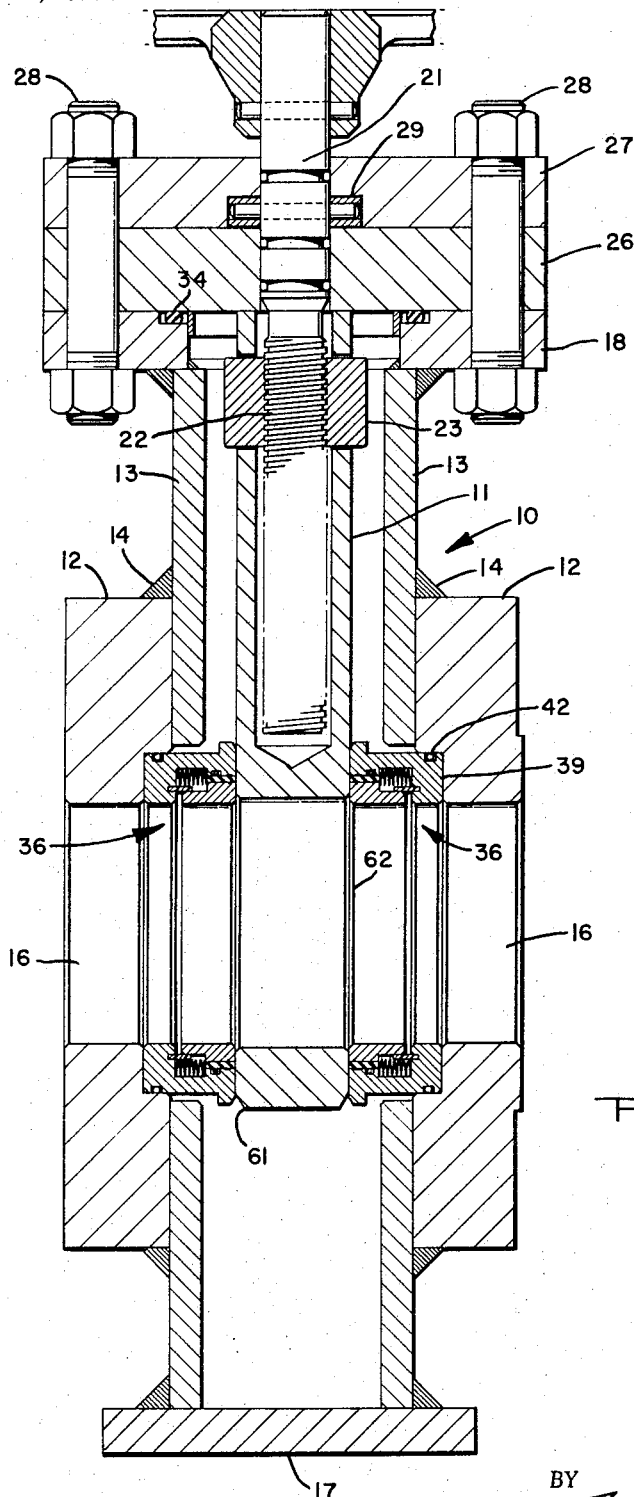
FIGURE 2 is a cross-sectional view taken along the line 2—2 of FIGURE 1.

The valve illustrated in FIGURES 1 and 2 is of the gate type and consists of a body 10 together with the inner valve gate 11. The body 10 can be made of a metal tube which is rectangular in section, or a body of this form can be made by fabricating methods. Relatively heavy hub plates 12 are attached to the end walls 13 of the body, as by welding 14. The openings 16 in the hub plates form aligned flow passages. One end of the body is shown closed by the bottom plate 17. The other end of the body is provided with the bolting flange 18 which mounts suitable bonnet means.

The valve gate 11 in this instance is flat, being provided with the side valve working surfaces 19. The operating stem 21 has a threaded portion 22 which extends into the gate, and is engaged by the nut 23. The upper end of the gate is provided with a keyhole shaped opening 24 within which the nut 23 is loosely retained. The outer end of the stem connects with suitable operating means, such as a hand wheel.

The bonnet means mounted upon the flange 18 includes the closure plate 26, together with the top plate 27, these parts being secured to the flange 18 by the bolts 28. The stem is carried by the thrust bearing assembly 29, and it is sealed with respect to the plates 26 and 27 by suitable means such as seal rings 31, 32, and 33 of the resilient O-ring type. Likewise, a suitable seal 34, such as one of the O-ring type, is provided between flange 18 and plate 26.

Upon both sides of the gate 11, assemblies 36 are provided which form seals between the gate and the body. One embodiment of these assemblies is shown in detail in FIGURES 3A, 3B and 3C.

Figure 3A:
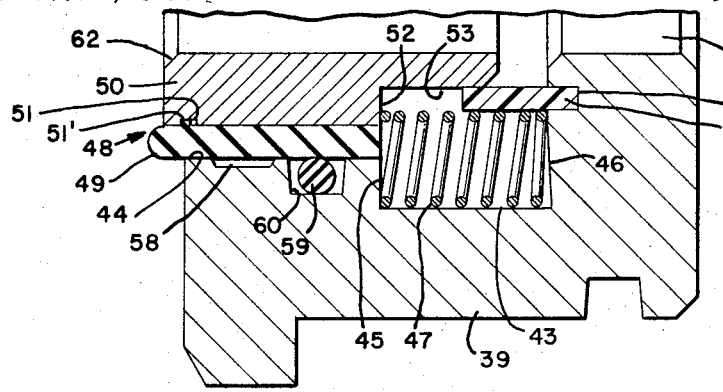
FIGURES 3A, 3B and 3C are details in section illustrating the sealing means incorporated in the valve of FIGURES 1 and 2 in various operating positions, namely before insertion of the gate, after the insertion of the gate with partial compression of the springs, and thirdly, the positioning of the parts on the downstream side of the valve and with the thrust of the gate being carried by the body.
Figure 3B:
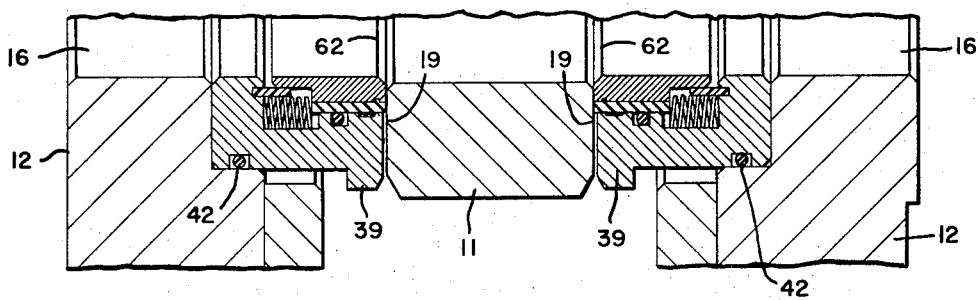

Each assembly consists of a mounting ring 39 which is removably fitted within the body and which serves to carry the sealing means. Referring to FIGURES 1 and 3B, it will be seen that each of the hub plates 12 is provided with a recess 41 which is dimensioned to receive a mounting ring 39. These parts are sealed with respect to each other by suitable means 42, which can be of the resilient O-ring type. It will be evident that if desired the mounting ring 39 can be an integral part of the body. In other words, it can be an annular portion integral with the hub plate or other adjacent part of the body. As shown in FIGURE 3A, the mounting ring 39 is machined to provide the peripheral surfaces 43 and 44, together with the shoulder 45 and the bottom surface 46. In effect this machining provides a peripheral surface for accommodating annular sealing means, and in addition, it provides a recess for accommodating the compression springs 47. Shoulder 46 is shown undercut or sloped.

The sealing means designated generally at 48 in FIGURE 3A consists of a sleeve-like seal ring 49 formed of resilient material, together with the carrier ring 50. The seal ring 49 may be made of various resilient materials, depending upon such factors as the size of the valve, the working pressures for which the valve is designed, and the service for which the valve is intended. In some instances, the seal ring may be made of a high quality synthetic rubber such as Hycar. In other instances it may be made of such materials as Teflon, Kel-F, or nylon. Another material which has been used with good results is a polyurethane plastic. The hardness of such resilient materials may vary somewhat depending again upon the design of the valve, its size and operating conditions. For working pressures up to 1000 p.s.i., I have found it satisfactory to use materials having a hardness of about 80 durometer. Materials like nylon are relatively harder, and are particularly suitable for the higher operating pressures. In FIGURE 3A it is assumed that the seal ring 50 is made of a resilient material having a hardness of about 80 durometer, as for example a polyurethane resilient plastic. It will be noted that the seal ring is made relatively thin in radial dimensioning and that its outer periphery conforms to a cylinder.

The body of the carrier ring 50 is relatively rigid and made of a suitable metal. Its outer periphery is bonded to the inner periphery of the seal ring 49. This bonding can be by virtue of suitable cements, or the seal ring 49 may be molded directly upon the outer periphery of the seal ring, with bonding being effected during the molding operation. The seal ring is shown provided with a rib 51 to interlock with a groove 51' on the outer periphery of the carrier ring.

The carrier ring is formed to provide the annular shoulder 52 adapted to seat upon the compression springs 47. Also it is provided with an annular portion 53 of reduced radial thickness which terminates in spaced relationship with the bottom surface 46 and which generally embraces the springs 47. For the purpose of protecting the space occupied by the springs from accumulation of sediment, a suitable sediment guard is provided which may be a ring 54 made of suitable non-metallic material such as nylon, one edge of which is fitted within a groove 55 formed in the mounting ring 39. It will be noted that the sediment guard extends in overlapping relation with the annular portion 53 of the carrier ring, thus protecting the space occupied by the springs from entrance of sediment.

The seal ring 49 has an outer cylindrical surface which is dimensioned whereby it slidably fits within the cylindrical surface 44 of the mounting ring. Sufficient clearance is provided to prevent jamming in the event some swelling of the seal ring occurs through absorption of liquids. As shown in FIGURE 3A, the peripheral surface 44 may further be relieved as indicated at 58 to provide space in which some swelling may occur without jamming.

Means is provided for forming a fluid-tight seal between the periphery of seal ring 49 and mounting ring 39, without however limiting axial movement of the seal ring and carrier ring relative to the mounting. This sealing means can be an O-ring 59 formed of suitable resilient material, such as a synthetic rubber, which is loosely disposed within the accommodating groove 60. The radial thickness of the O-ring may be comparable to the radial dimensions of the sleeve-like ring 49, as illustrated.

Figure 4:
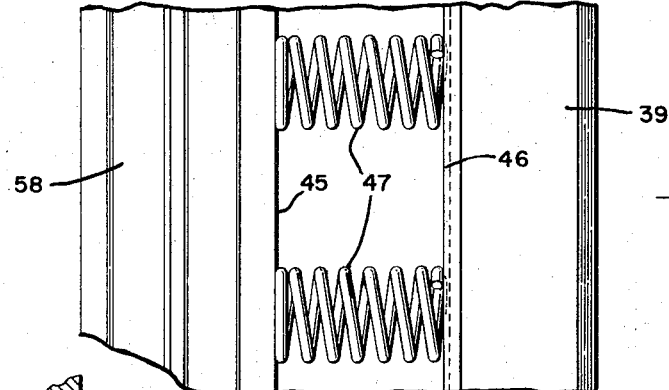
FIGURE 4 is a detail in section ilustrating the manner in which the compression springs are applied before installing the seal ring.

The manner in which the compression springs are incorporated with the assembly is disclosed and claimed in my copending application Ser. No. 415,046 filed Dec. 1, 1964 (filed simultaneously herewith). Briefly, the compression springs are positioned in spaced circumferential relationship between the shoulder 45 and the bottom surface 46 in the manner shown in FIGURE 4. Before the springs are inserted they have a length somewhat greater than the distance between shoulder 45 and surface 46. Before the carrier ring and seal ring 49 have been applied to the mounting ring, and before the sediment guard 54 has been applied, the coil springs are placed between the shoulder 45 and the surface 46, with sufficient manual compression at that time to enable such positioning whereby after an applied spring has been released, a portion of its one end presses against the retention shoulder 45 and thereby is retained in such position. The strength of the compression springs and the number used in a particular assembly is dependent upon various factors, including the size of the valve, the operating pressure for which the valve is designed, and the character of the resilient material used in forming the seal ring 49. The slope of surface 46 aids in effecting retention of the springs. After all of the compression springs 49 have been properly positioned between shoulder 45 and bottom surface 46, the sediment guard 54 is applied and then the carrier ring and seal ring 49 are applied in the manner shown in FIGURE 3A.

FIGURE 3A shows the positioning of the parts before the valve gate has been inserted into the valve body. Note that the surface 45 is co-planar with the surface 52. At this time all of the thrust of the compression springs is carried by the shoulder 45. As shown in FIGURE 1, the lower end of the gate is bevelled as indicated at 61, and likewise the carrier ring is bevelled as indicated at 62. When the gate is inserted downwardly through the body, it engages the seal rings 49 and carrier rings 50 and forces them apart a sufficient distance to permit passage of the gate.

After the gate has been fully inserted, the positioning of the parts on each side of the valve is substantially as shown in FIGURE 3B. Note that the valve working surfaces 19 of the gate 11 are in fluid-tight engagement with the ends of the seal rings 49. The latter are somewhat flattened because of the thrust of the springs. A fluid-tight seal is now established on both sides of the gate, between the gate and body. When line pressure is applied to one of the flow passages 16, and the gate is in closed position, fluid pressure upon the gate forces it toward the downstream side, and such limited movement is accommodated by a corresponding movement of both the seal rings 49 and the carrier rings 50, with further compression of the springs 47 on the downstream side. With sufficient pressure differential, the gate on the downstream side directly engages the adjacent end of the mounting ring 37, whereby with higher pressure differential, the thrust of the gate is taken by the mounting ring and transmitted directly to the body (FIGURE 3C).

When the gate moves a slight amount toward the downstream side upon application of a pressure differential, the seal ring and carrier ring upon the upstream side likewise move a corresponding amount whereby the upstream seal ring maintains fluid-tight contact with the gate. During the limits of such movement, the upstream compression springs 47 continue to apply thrust to the carrier and seal rings.

Figure 3C:
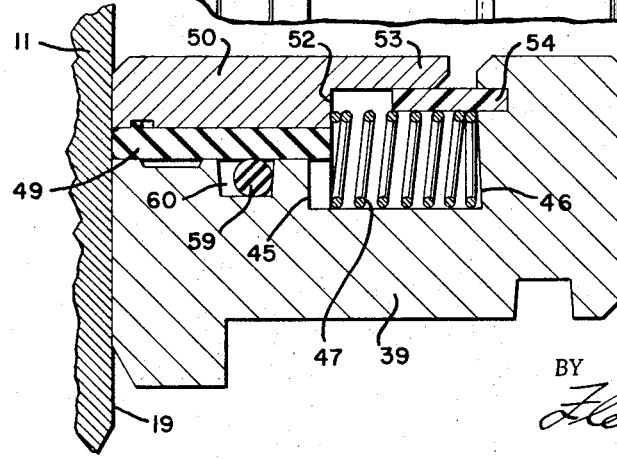

Within the proportions illustrated in FIGURES 3A, 3B and 3C, the effective diameter of the seal between the end of the seal ring 49 and the gate, and the inner periphery of the O-ring 59, are substantially the same. Therefore this sealing means is not affected to any substantial degree by pressure differentials between the fluid passages and the interior of the body. Thus the thrust of the carrier and seal rings against the gate is determined primarily by the strength and number of the compression springs.

Figure 5:
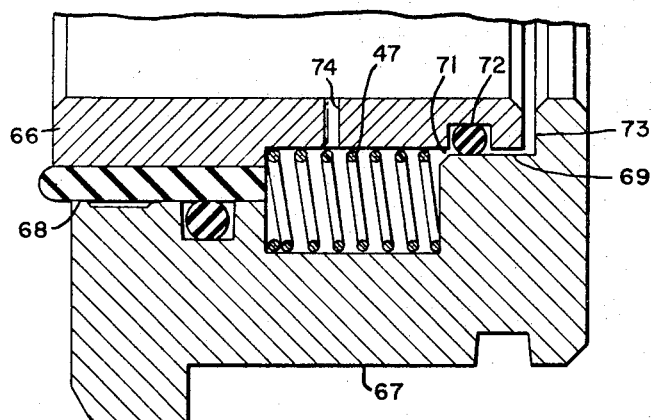
FIGURE 5 is a detail in section illustrating an embodiment in which means of the resilient O-ring type is employed in place of the sediment guard shown in FIGURE 3A.

The embodiment shown in FIGURE 5 differs in some respects from that of FIGURE 3A. Particularly, the carrier ring 66 is somewhat differently proportioned, and the rib for interlocking between the seal ring and the carrier ring is omitted. The mounting ring 67 corresponds to the mounting ring 39 of FIGURE 3A and is formed to provide the peripheral surface 68. Instead of utilizing the annular sediment guard 54 of FIGURE 3A, the annular portion 69 of the carrier ring is provided with a groove 71 for accommodating the seal ring 72 of the O-ring type. A vent (not shown) can be provided through the annular portion 69 to permit equalizing of pressure between the adjacent flow passage and the space occupied by the compression springs 47. When the gate is pressed against the downstream side it seats on the metal mounting ring and also on the adjacent end of carrier ring 66, while the other end of ring 66 seats on shoulder 73. Thus, except for the small pressure equalizing duct 74, a metal-to-metal secondary seal is formed.

Figure 6:
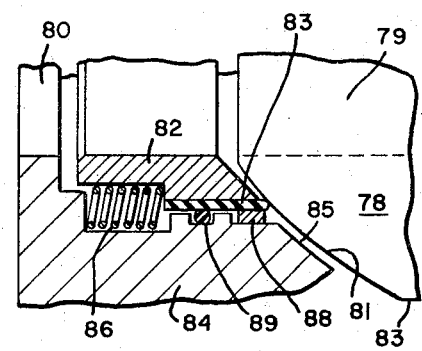
FIGURE 6 is a detail like FIGURE 5 but showing another embodiment of sealing means for use in a valve of the ball type.

The embodiment of FIGURE 6 is a sealing assembly for a valve of the ball type. Such a valve includes a rotatable ball 78, which is turned through 90° between full open and closed positions. The ball has a transverse port 79 adapted to register with the flow passages 80 when the valve is in full open position. The ball is provided with a substantially spherically shaped valve working surface 81, which cooperates with the sealing assembly. Also the ball may be carried by suitable trunnions. The sealing assembly in this instance includes the carrier ring 82, together with the resilient seal ring 83, which in this instance is assumed to be made of synthetic rubber, or a resilient plastic material like polyurethane. The body 84 is machined to provide the peripheral surface 85 within which the seal ring 83 is loosely fitted. Also it is machined to accommodate the compression springs 86 in the same general manner as in FIGURE 4. The seal ring 83 is bonded to the outer periphery of the carrier ring 82, and in addition the end portion adjacent the ball 78 has its outer periphery bonded to the reinforcing ring 88. The O-ring 89 carried by the body engages the outer periphery of the seal ring 83.

Figure 7A:
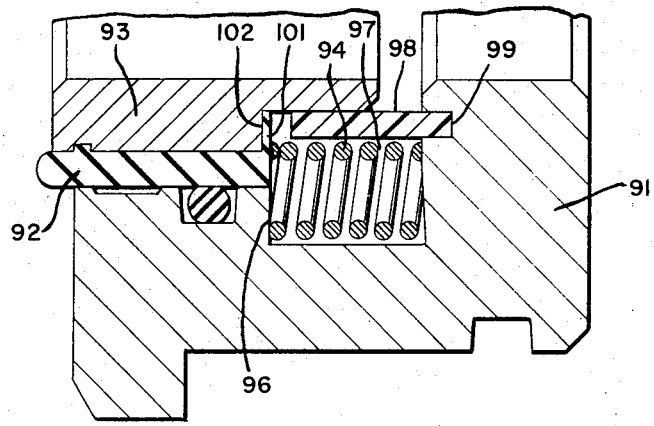
FIGURE 7A is a detail in section illustrating another embodiment of the sealing means.
Figure 7B:
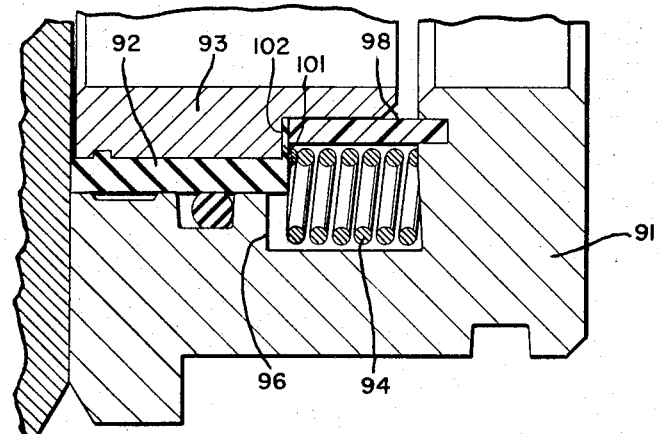
FIGURE 7B is a detail in section like FIGURE 7A but with the parts in a different operating position.

The embodiment illustrated in FIGURES 7A and 7B incorporates a special means for sealing upon the downstream side. The mounting ring 91 is substantially the same as in FIGURE 3A. The seal ring 92 is likewise similar to that shown in FIGURE 3A and is bonded to the metal carrier ring 93. For the relaxed position shown in FIGURE 7A, the compression springs 94 press against the annular shoulder 96. The carrier ring includes the annular portion 97 which generally surrounds the space occupied by the compression springs. The sediment guard 98 is made of suitable material such as nylon, and has its one edge seated within the recess 99. At the inner end of the seal ring 92 there is an annulus 101 of resilient material which can be integral with the seal ring and which overlies and preferably is bonded to the annular shoulder 102 on the carrier ring.

For the relaxed position of the assembly shown in FIGURE 7A, there is a space between the resilient annulus 101 and the adjacent end of the sediment guard 98. On the downstream side of the valve shown in FIGURE 7B (assuming application of line pressure with the gate in closed position) the seal 92 and carrier ring 93 have compressed the spring 94 and the dimensions are such that the resilient annulus 101 presses against the adjacent end face of the sediment guard 98. Under such conditions, the sediment guard forms a seal on the downstream side of the valve. Although this supplemental seal is effective when the valve is in closed position and line pressure is applied, it does not function to provide a seal on the upstream side. Furthermore, it does not become effective until the gate is moved by fluid pressure against the downstream side with sufficient force to press the resilient annulus 101 against the sediment guard.

It will be evident that the invention as described above has a number of desirable features. Particularly, the sealing assembly is relatively simple, and because of the manner in which the resilient material is mounted upon the carrier ring, a wide variety of resilient materials can be employed. In addition, the construction permits the use of relatively resilient synthetic materials, although the assemblies may be made for a relatively wide range of operating pressures. The thiness of the resilient material in radial dimensioning permits an effective seal, without the use of inserts of the type disclosed in my aforesaid application Ser. No. 253,416.

I claim:

In a valve construction, a body part having aligned flow passages, a valve part disposed within the body part and movable between open and closed positions relative to the passages, the valve part having a valve working surface, and annular sealing means disposed to form a fluid-tight seal between the valve working surface and the body in a region surrounding the corresponding flow passage, said means comprising a sleeve-like seal ring formed of resilient material and having an outer uninterrupted cylindrical periphery, a relatively rigid metal carrier ring, the outer periphery of the carrier ring being bonded to the inner periphery of the seal ring over substantially the entire axial length thereof, said seal ring being relatively small in radial thickness compared to the radial thickness of the carrier ring, one end of said seal ring being adapted to contact and seal with respect to the valve working surface over an annular area limited by its said radial thickness, means on the body part serving to carry the seal ring and the carrier ring for some freedom of axial movement, spring means serving to apply thrust to urge the seal ring against said valve working surface, the carrier ring being formed to provide an annular shoulder substantially coincident with the other end of the seal ring, said spring means being seated on said shoulder and said other end of the seal ring, and means including a resilient seal ring of the O-ring type having sealing contact with the outer cylindrical periphery of said resilient seal ring for establishing a seal between said seal ring and the body part, said last named seal ring being accommodated within an annular recess formed in the body part.

References Cited

UNITED STATES PATENTS

| | | | |
|---|---|---|---|
| 2,623,724 | 12/1952 | Downey | 251—174 X |
| 3,006,599 | 10/1961 | Eckert | 251—174 X |
| 3,121,553 | 2/1964 | Grove | 251—172 |
| 3,166,291 | 1/1965 | Grove | 251—172 |
| 3,203,442 | 8/1965 | Grove | 251—328 X |
| 3,226,769 | 8/1966 | Shand | 251—172 |
| 3,273,587 | 9/1966 | Fausek | 137—323 |

WILLIAM F. O'DEA, *Primary Examiner.*

H. W. WEAKLEY, *Assistant Examiner.*